(12) United States Patent
Ablonet

(10) Patent No.: US 11,867,598 B2
(45) Date of Patent: Jan. 9, 2024

(54) AUTOMATIC SAMPLING SYSTEM AND METHOD

(71) Applicant: COMPAGNIE GENERALE DES ETABLISSEMENTS MICHELIN, Clermont-Ferrand (FR)

(72) Inventor: Thierry Ablonet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 432 days.

(21) Appl. No.: 17/275,979

(22) PCT Filed: Sep. 9, 2019

(86) PCT No.: PCT/EP2019/073978
§ 371 (c)(1),
(2) Date: Mar. 12, 2021

(87) PCT Pub. No.: WO2020/053139
PCT Pub. Date: Mar. 19, 2020

(65) Prior Publication Data
US 2022/0034759 A1     Feb. 3, 2022

(30) Foreign Application Priority Data
Sep. 13, 2018 (FR) ...................................... 1858196

(51) Int. Cl.
*G01N 1/00* (2006.01)
*G01N 1/08* (2006.01)
*B26D 3/00* (2006.01)
*B26D 7/18* (2006.01)

(52) U.S. Cl.
CPC ............... *G01N 1/08* (2013.01); *B26D 3/003* (2013.01); *B26D 7/1818* (2013.01)

(58) Field of Classification Search
None
See application file for complete search history.

(56) References Cited

U.S. PATENT DOCUMENTS 9,284,420 B2 * 3/2016 De Gaudemaris ......... C08J 3/22
9,290,626 B2 * 3/2016 De Gaudemaris ....... C08K 3/36

FOREIGN PATENT DOCUMENTS

| JP | 5-306975 | * 11/1993 |
| JP | 5-306975 A | 11/1993 |
| JP | 2007-171117 A | 7/2007 |
| JP | 2007171117 A | * 7/2007 |

OTHER PUBLICATIONS

International Search Report dated Nov. 8, 2019, in corresponding PCT/EP2019/073978 (4 pages).

* cited by examiner

*Primary Examiner* — Brandi N Hopkins
*Assistant Examiner* — Nigel H Plumb
(74) *Attorney, Agent, or Firm* — VENABLE LLP

(57) ABSTRACT

An automatic sampling system (100) and an automated sampling method take samples of a rubber strip after shaping and while scrolling in a predetermined direction.

9 Claims, 7 Drawing Sheets

AUTOMATIC SAMPLING SYSTEM AND METHOD

TECHNICAL FIELD

The invention relates generally to sampling of a rubber strip in order to examine its properties. More particularly, the invention relates to automatic sampling of rubber to prevent unexpected variations in the rubber properties after shaping of a rubber strip.

BACKGROUND

In the field of production of rubber mixtures, mixing lines, constituting external and/or internal, continuous and/or discontinuous mixers, are known to carry out rubber mixing processes. In the mixers (continuous and discontinuous), it is possible that the dispersion and mixing ratio of the raw materials (e.g., chemicals) may be modified. It is therefore desirable to test the physical properties of the rubber to ensure its quality, reproducibility and processability downstream in the tire manufacturing line (for example, by performing different processes, including extrusion processes). Tests may include those to determine the rheological, visual and other properties of a material, such properties being appreciated by the skilled person as characterizing the state of mixing of the rubber mixture. Unexpected variations in rubber properties may require the stopping of the mixing line and may also implicate processes upstream and/or downstream of the mixing line. Therefore, in order to maintain quality control and productivity control in the rubber mixing manufacturing environment, rubber mixture samples are regularly tested.

In known sampling processes, samples can be taken from uncured rubber that is in the form of a sheet or strip made by an extruder or multi-roll calender. Several solutions have been proposed by the prior art to obtain these samples, including JP 2007-171117 (which discloses the passage of a rubber sheet, from an extruder, between an anvil and a reciprocating knife located in the anvil, the knife with an orifice in which a sample of the rubber is taken from the lowering of the knife onto the sheet and with a vacuum that picks up the sample in order to transport it toward a sample measuring device); and document JPH05306975 (which discloses a cutting device of a sample forming means that forms samples by perforating a rubber strip while the strip is continuously conveyed immediately after the strip is formed). In these configurations, it is necessary to slow down, almost to a complete stop, the conveyance of the rubber strip.

In another known system, shown in FIGS. 1 and 2, an automatic sampling system (or "system") 10 is provided. This system does not involve stopping the conveyance of a rubber strip during a sampling cycle. The system 10 includes an anvil 12, which is rotatably attached to a fixed support 14, and a rotating punch (or "punch") 16, which is rotatably attached to a drive shaft 18 (see arrow A in FIG. 1). The anvil 12 includes a cylinder of a predetermined diameter and with a circumferential surface 12a that engages a rubber strip 20 as it moves along a path between the anvil and the punch 16 (see arrow B in FIG. 1).

The punch 16 includes a cylindrical housing 22 of a predetermined length that extends between a sampling end 22a and an opposite installation end 22b. A known cylindrical die-cutter (or "knife") 24 with an annular blade 24a is provided at the sampling end 22a of the housing 22. The annular blade 24a has a predetermined diameter to perforate the rubber strip 20 and to take samples of the rubber strip during its conveyance between the anvil 12 and the punch 16.

The punch 16 also includes a reciprocating ejector (or "ejector") 26 that is located inside the punch. The ejector 26 has a predetermined length between a release surface 26a (see FIG. 2) and an opposed attachment surface 26b. The release surface 26a is a flat surface for releasing each rubber sample obtained by the die-cutter 24. The attachment surface 26b includes a fastener 28 with a known fastening means (e.g., screwing, welding, bonding, and equivalent means). The ejector 26 also includes an elongated recess 26c in which a hook 28 is arranged so that the hook can engage each rubber sample simultaneously with the sampling of the rubber strip by the die-cutter 24.

The punch 16 also includes an actuator 30 constituting a piston 32 with a rod 32a and a chamber 34 in which the piston slides. The actuator 30 is selected from commercially available actuators. The rod 32a of the piston 32 includes a known fastening device that corresponds to the fastening means 28, allowing connection of the piston and the ejector 26. The piston 32 is actuated by a pressurized fluid (e.g., compressed air) coming from a conduit (not shown). As a result, the movement of the piston 32 effects corresponding movement of the ejector 26 between a standby position (where the fastening means 28 extends from the release surface 26a of the ejector so that it is ready to engage the sample at the same time as the rubber strip is sampled by the die-cutter 24) and a release position (where the fastening means 28 no longer engages the sample taken from the rubber strip 20 and the sample is released by the ejector 26).

However, the system 10 does not guarantee the release of the sample in cases where tacky samples remain adhered to the release surface 26a of the ejector 26. In addition, particles that pass between the die-cutter 24 and the ejector 26 may cause the ejector to jam or the actuator to bend when returning to the standby position. Guidance of the ejector 26 can therefore lead to problems of premature wear of the seals at the level of the rod 32a of the piston 32. Taking samples from tacky mixtures or thin strips is particularly problematic: the movement of the ejector can be blocked in an extended position if pieces of rubber get caught between the fastening means and the ejector.

Thus, no current system ensures a sufficient success rate for continuous sampling of a continuously moving rubber strip. In addition, no current system guarantees a sample transfer that is efficient enough to analyze samples taken from a continuously moving rubber strip.

SUMMARY

The invention is directed to an automatic sampling system for taking samples from a rubber strip after it has been shaped and while it is moving in a predetermined direction. The system includes an anvil with a cylinder of a predetermined diameter and with a circumferential surface that engages the rubber strip during its movement, the anvil being fixed so that it can rotate about an axis of rotation. The system also includes a punch with a cylindrical housing of a predetermined length extending from a sampling end to an opposite installation end. The punch includes:

a die-cutter provided at the sampling end for perforating the rubber strip and to obtain samples of the rubber strip while it is moving, the die-cutter with an annular blade of a predetermined diameter;

a fastening and support element provided at the installation end for effecting the installation of the punch in relation to a drive shaft to which the punch is rotatably attached, the punch turning in the same direction as the movement of the rubber strip;

an ejector disposed within the housing that moves along a common longitudinal axis among the ejector, the housing and the die-cutter, the ejector including a structure with a predetermined length extending between a release end and an opposite attachment end, the release end having a domed surface characterized by a tapered surface that facilitates release of the sample, and the attachment end including an attachment; and a rod cylinder having a piston with a rod and a chamber in which the piston slides, the rod cylinder including a fastening device for connecting the piston and the ejector so that the movement of the piston in the chamber upon supply of pressurized fluid effects corresponding movement of the ejector between a standby position and a release position.

In some embodiments, the ejector also includes a recess in the structure and in which a fixed hook is arranged so that the hook extends from the domed surface when the ejector is in the standby position, and so that each sample is released from the ejector when the ejector is in the release position.

In some embodiments, the hook includes an arm with an inclined surface that engages a correspondingly inclined surface of the recess to allow further movement of the ejector relative to the attached hook. There are some embodiments in which the arm has an engagement end at which a catch is provided that includes one or more grooves so that the hook can engage samples taken from the rubber strip simultaneously with their sampling by the cylinder-punch.

In some embodiments, the punch further includes a guide ring with an opening, the guide ring being disposed at the sampling end of the housing along a common longitudinal axis among the housing, the die-cutter and the ejector to allow guiding of the ejector between the standby and the release position.

In some embodiments, the fastening and support element includes two or more conduits in fluid communication with corresponding conduits that supply the rod cylinder with pressurized fluid.

The invention is also directed to an automated process for sampling a rubber strip moving in a predetermined direction. The process includes the following phases:

a first phase of the process including the following steps:
the step of shaping the rubber strip to a predetermined thickness;
the step of directing the rubber strip, after its shaping, to an automatic sampling system as disclosed so as to pass between the anvil and the punch;
the step of rotating the punch in the same direction as the movement of the rubber strip with the ejector in a standby position;

a second phase of the process including the following steps:
the step of sampling the rubber strip by the die-cutter with the ejector remaining in the standby position and the hook engaging the rubber strip simultaneously with a continuous rotation of the punch; and
the step of taking a sample with the die-cutter;

a third phase of the process including the following step:
the step of engaging the sample taken during the second phase, with the ejector remaining in the stand-by position and with the hook securing the sample taken while the punch rotates toward a down position;

and a fourth phase of the process including the following steps:
the step of supplying the rod cylinder with pressurized fluid to effect corresponding movement of the ejector from the standby position to the release position, this step being performed simultaneously with the continuous rotation of the punch to the down position; and
the step of removing the sample from the domed surface towards a recovery means.

In some embodiments, the process further includes the step of training the system to recognize at least one among an optimal size and an optimal frequency for sampling the rubber strip.

In some embodiments, the process also includes a classification of samples generated by self-learning means.

Other aspects of the invention will become evident from the following detailed description.

BRIEF DESCRIPTION OF THE FIGURES

The nature and the various advantages of the invention will become more obvious when reading the following detailed description, together with the attached drawings, in which the same reference numbers designate identical elements throughout, and in which.

DETAILED DESCRIPTION

Referring now to FIGS. 3 to 10, in which the same numbers identify identical elements, an embodiment is represented of an automatic sampling system (or "system") 100. In sampling processes realized by the system 100, samples are obtained by perforating an unvulcanized rubber in the form of a rubber sheet or strip 1000 (see FIG. 10) shaped by an extruder or by a multi-roll calender (not shown). The rubber strip 1000 is shaped with a top surface 1000a, an opposite bottom surface 1000b and a predetermined thickness between the two surfaces (see FIG. 10). The system 100 takes samples from the rubber strip 1000 immediately after it is shaped in a mixing line, and while it is running in a predetermined direction (see arrow C in FIG. 10). As used herein, the terms "sheet", "strip", "ply" and their known equivalents are interchangeable.

Figure 10:
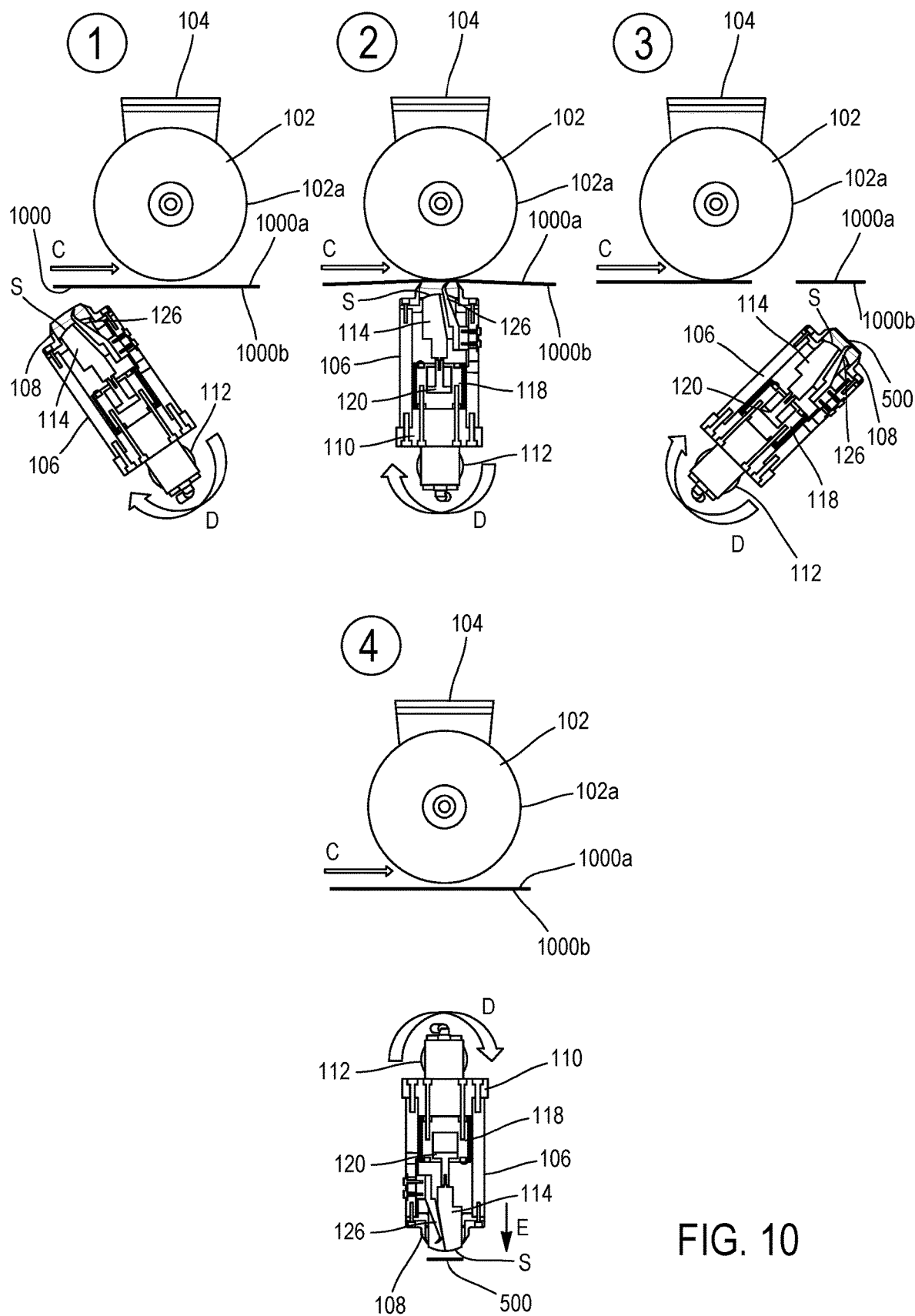
FIG. 10 represents an embodiment of a process carried out by the system of the invention.

Referring to FIGS. 3 to 6, the system 100 includes an anvil 102 having a cylinder of a predetermined diameter and with a circumferential surface 102a that engages the upper surface 1000a of the rubber strip during its movement (see FIG. 10). The anvil 102 is rotatably fixed (e.g., with respect to a fixed support 104) so that it can rotate about an axis of rotation X.

The system 100 also includes a rotary punch (or "punch") 106 with a cylindrical housing (or "housing") 106a of a predetermined length extending between a sampling end 106a' and an opposite installation end 106a". A die-cutter (or "knife") 108 is provided at the sampling end 106a' of the housing 106a for perforating the rubber strip 1000 and for obtaining samples of the rubber strip as it moves between the anvil 102 and the punch 106.

The die-cutter 108 includes an annular blade 108a with a predetermined diameter that can be modified as a function of the desired sample size. A fastening and support element 110 is provided at the installation end 106a" to effect reliable installation of the punch 106 with respect to a drive shaft 112 to which the punch is rotatably attached (see FIG. 10). The punch 106 rotates around an axis of rotation of the drive shaft 112 in the same direction as the movement of the rubber strip 1000. The punch 106 is therefore able to rotate either clockwise (see arrow D in FIG. 10) or counterclockwise.

A reciprocating ejector (or "ejector") 114 is arranged inside the housing 106a along a common longitudinal axis Y among the ejector, the housing and the die-cutter 108. The ejector 114 moves along the common longitudinal axis Y within the housing 106a and, during sampling cycles, within the die-cutter 108 (see FIG. 4). The ejector 114 includes a structure 114a with a predetermined length that extends between a release end 114a' and an opposite attachment end 114a". The attachment end 114a" includes a fastener 116 having a known fastening means (e.g., screwing, welding, gluing, and equivalent means). The release end 114a' includes a domed surface S that is characterized by a tapered surface area in contact with each sample taken by the die-cutter 108 (see FIG. 5). The domed surface S facilitates the release of each sample by making it fold back on itself, which solves the problems of adhesion when the sample is released.

Figure 1:
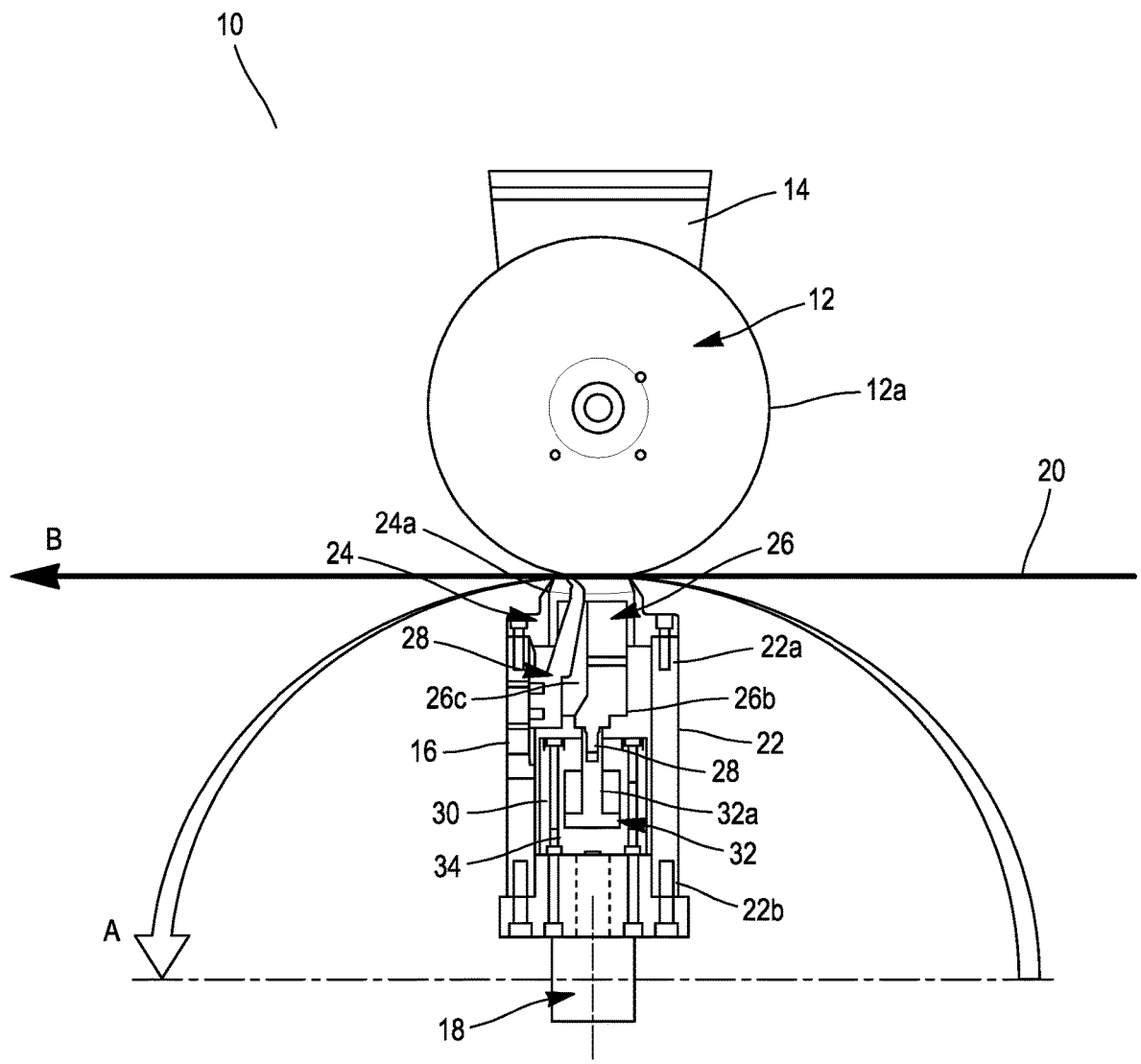
FIG. 1 represents a front cross-sectional view.
Figure 2:
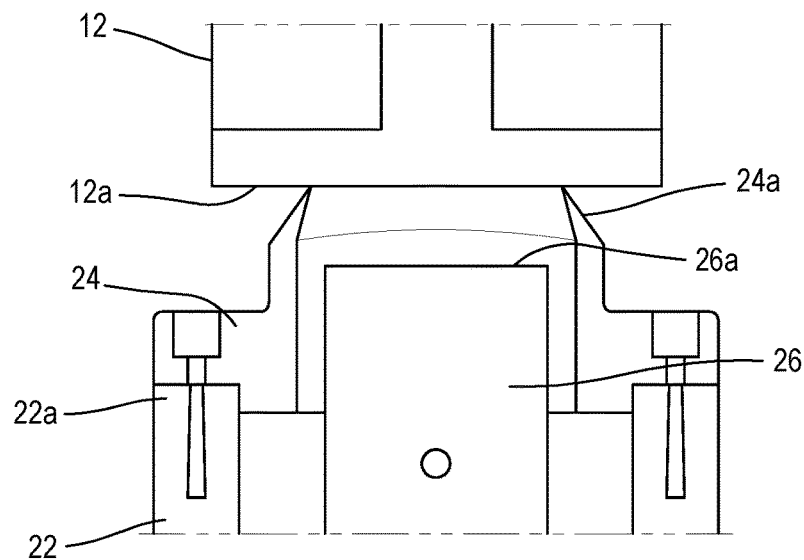
FIG. 2 represents a partial cross-sectional view, of a known automatic sampling system.
Figure 3:
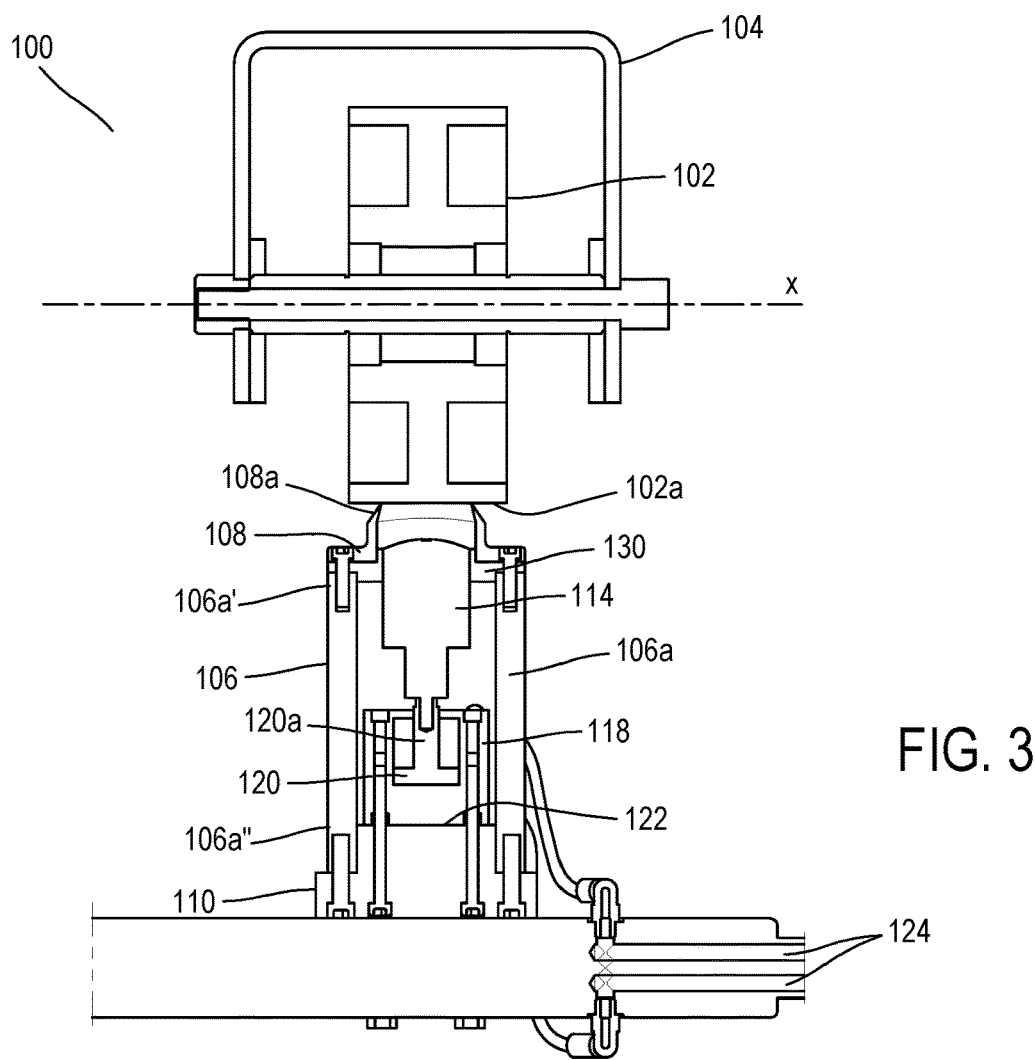
FIG. 3 represents a lateral cross-sectional view of an automatic sampling system of the invention.
Figure 4:
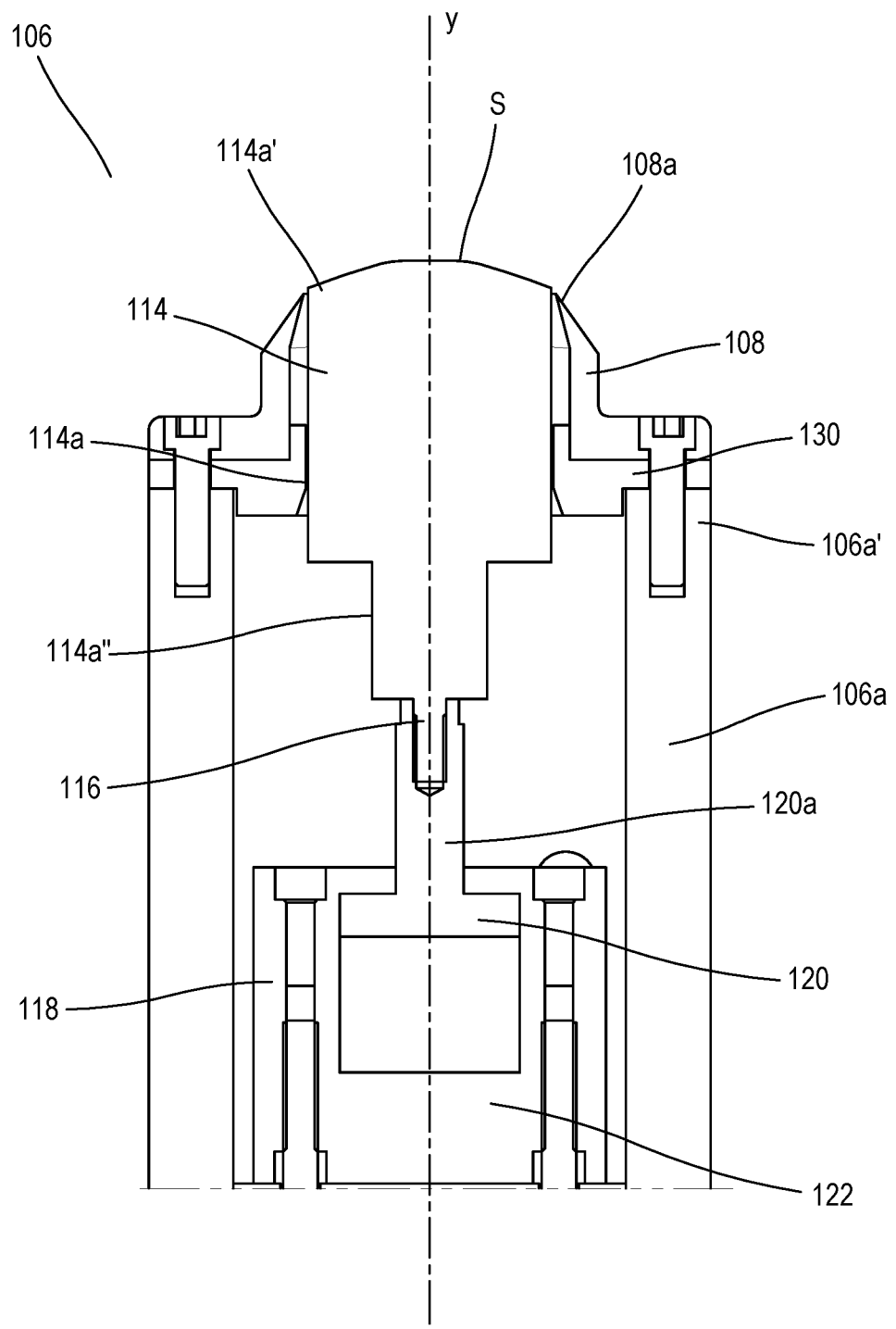
FIG. 4 represents a cross-sectional view of a punch of the system of FIG. 3.
Figure 5:
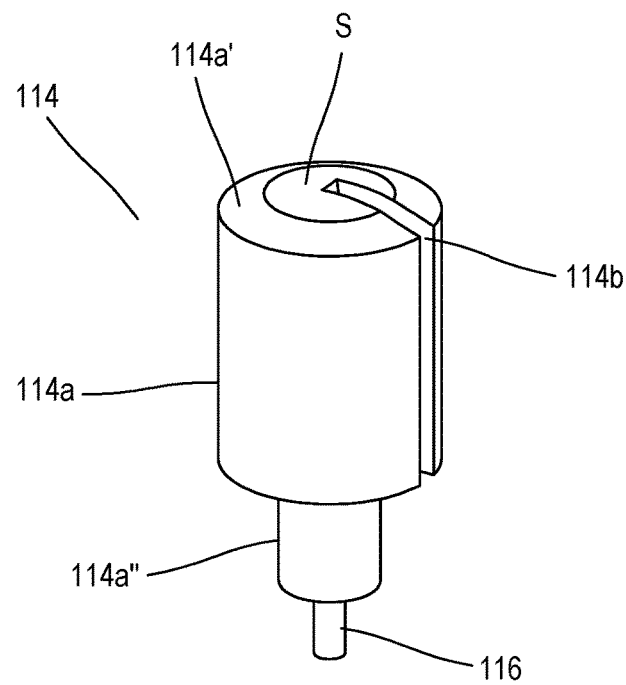
FIG. 5 represents a perspective view of an ejector of the punch of FIG. 3.
Figure 6:
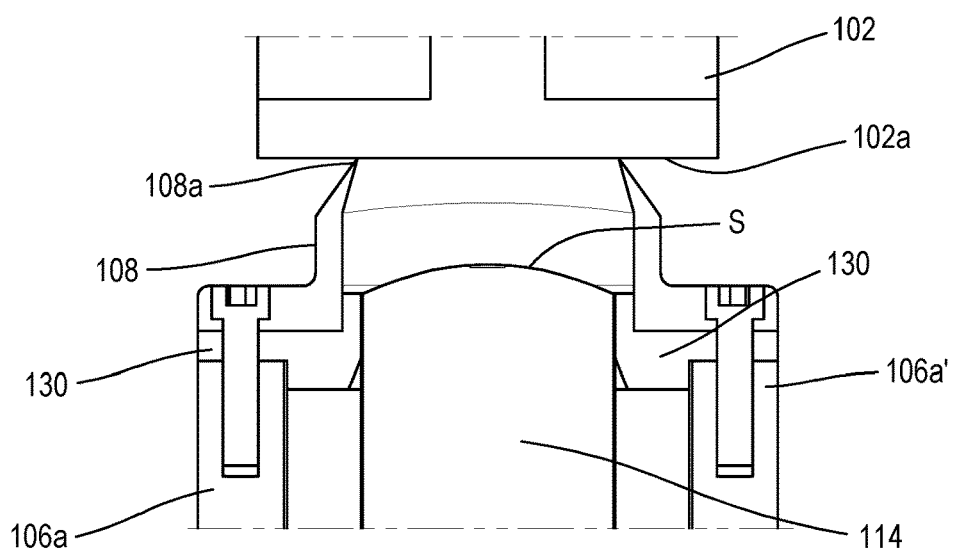
FIG. 6 represents a partial view of a die-cutter and a guide ring of the punch of FIG. 4 engaged against an anvil of the system of FIG. 3.
Figure 7:
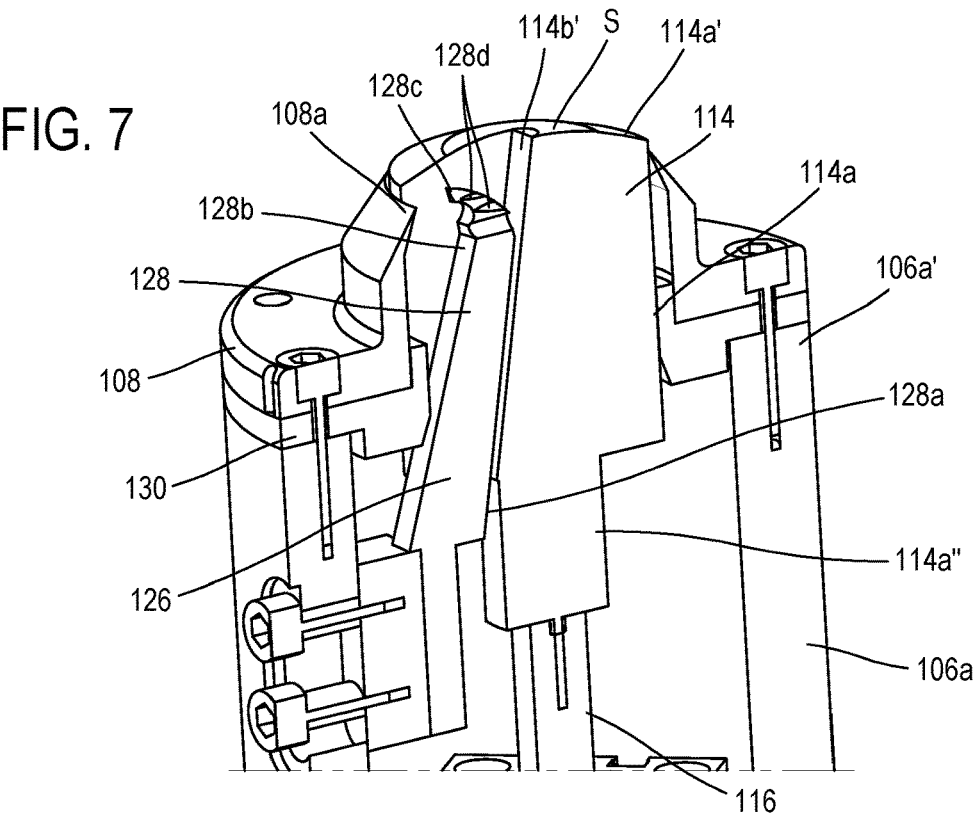
FIGS. 7 and 8 represent partial sectional views of embodiments of a hook of the punch of FIG. 4.
Figure 8:
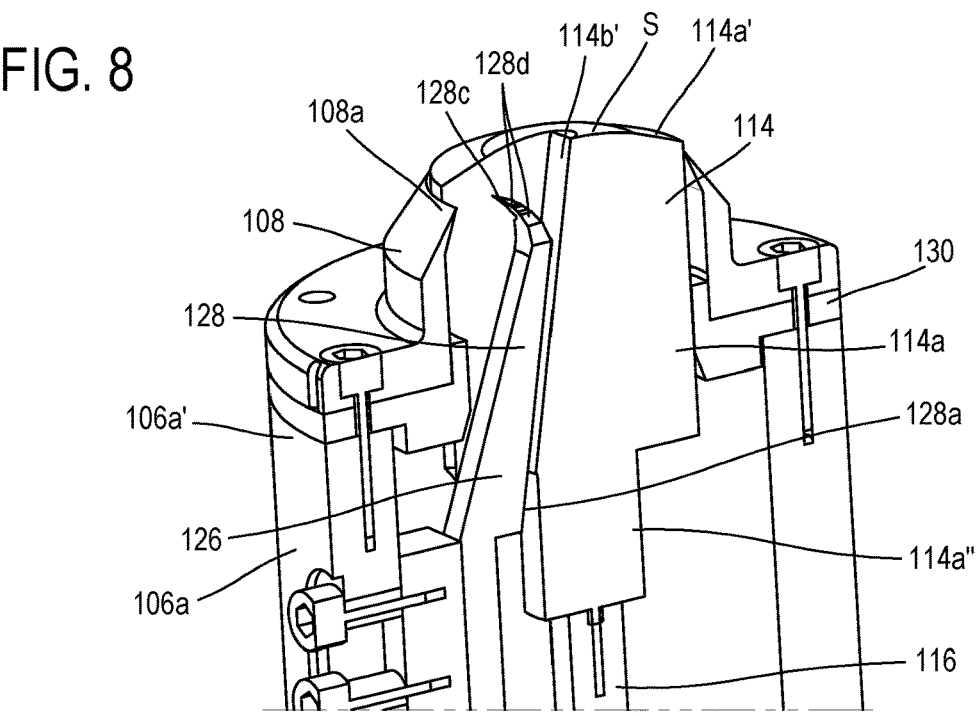
Figure 9:
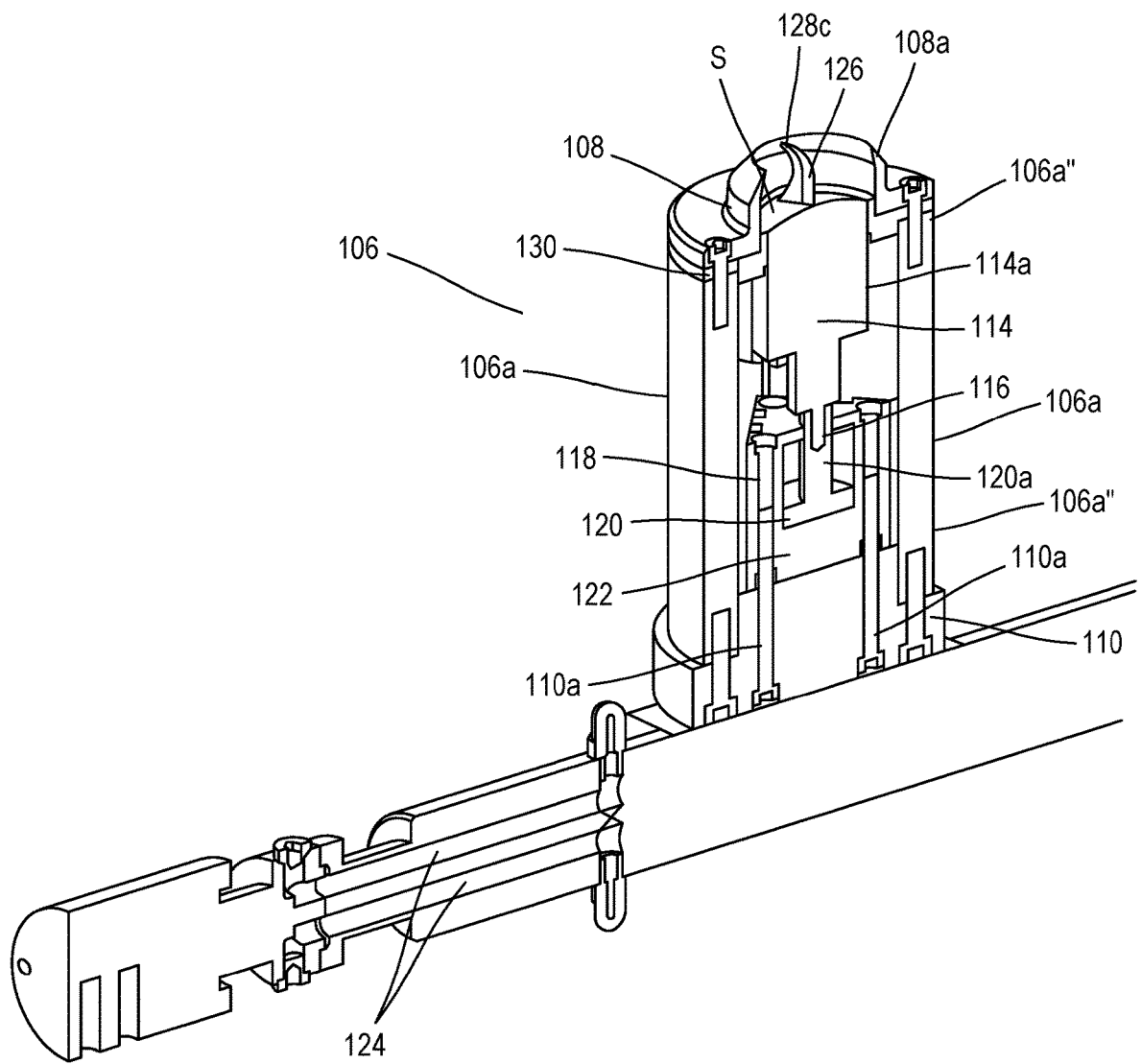
FIG. 9 represents a side cross-sectional view of the system of FIG. 3 in communication with pressurized fluid supply conduits.

Referring again to FIGS. 3 to 6 and also to FIGS. 7 to 9, the ejector 114 has an elongated recess (or "recess") 114b in the structure 114a. A hook 126 is located in the recess 114b, and the hook includes an arm 128 of spring steel type material. The hook 126 is attached to the housing 106a so that the hook can engage each sample taken from the rubber strip simultaneously with its sampling by the die-cutter 108. The arm 128 of the hook 126 includes an inclined surface 128a that engages with a corresponding inclined surface 114b' of the recess 114b when the ejector 114 takes a release position (described below). There is a space between the inclined surfaces to allow additional movement of the ejector 114 relative to the attached hook.

The arm 128 has an engagement end 128b forming a catch 128c. The catch 128c may include one or more additional splines including one or more splines 128d that optimize the capture of the sample. It is understood that the catch 128c can be modified according to the characteristics of the ejector 106 (e.g., its length, the depth of the recess 114b, etc.) and according to the characteristics of the rubber (e.g., its viscosity, its thickness, etc.). The system 100 can include several embodiments of the hook 126 (for example, in a kit) to perform various sampling cycles.

Referring again to FIGS. 3 to 9, the punch 106 also includes a rod cylinder 118 constituting a piston 120 with a rod 120a and a chamber 122 in which the piston slides. The rod cylinder 118 is selected from commercially available cylinders. The rod 120a of the piston 120 includes a known fastening device that corresponds to the fastening means 116 of the ejector 114, allowing connection of the piston and the ejector.

The piston 120 moves in a reciprocating motion in the chamber 122 due to the supply of a pressurized fluid (for example, compressed air). The fastening and support element 110 includes two or more conduits (not shown) in fluid communication with corresponding conduits 124 that supply the rod cylinder 118 during sampling cycles (see FIG. 3 and also FIG. 9). The movement of the piston 120 effects the corresponding movement of the ejector 114 along the common longitudinal axis Y. As a result, the ejector 114 moves between a standby position (where the hook 126 extends from the domed surface S of the ejector 114 so that it is ready to engage a sample at the same time as a rubber strip is sampled by the die-cutter 108) and a release position (where the hook 126 no longer engages the sample taken from the rubber strip and the sample is released by the ejector 114 to a recovery means).

In the standby position of the ejector 114 (shown in FIGS. 3, 6, and 9 and also in the first, second, and third phases 1, 2, and 3, respectively, of FIG. 10), the hook 126 extends from the domed surface S of the ejector so that it is ready to engage the bottom surface 1000b of the rubber strip 1000 simultaneously with its sampling by the die-cutter 108 (see phase 2 of FIG. 10). In the release position of the ejector 114 (shown in FIGS. 4, 7 and 8 and also by phase 4 of FIG. 10), the movement of the ejector brings the inclined surface 114b' of the recess 114b along the corresponding inclined surface 128a of the arm 128. As a result, the catch 128c of the arm 128 is lifted from the bottom surface 1000b of the rubber strip 1000, and the sample is retained on the domed surface S of the ejector 114.

Referring again to FIGS. 4 and 6 to 8, the punch 106 also includes a guide ring 130 with an opening that is traversed by the ejector 114 during the sampling cycles. The guide ring 130 is arranged at the sampling end 106a' of the housing 106a along a common longitudinal axis among the housing, the guide ring, the die-cutter 108 and the ejector 114. The guide ring 130 allows guidance of the ejector 114 between the standby position (where the ejector remains in the housing 106) and the release position (where the ejector 114 traverses the opening 130a and the inside of the die-cutter 108 during the sampling cycles). The guide ring 130 also prevents particles from blocking the ejector 114 and accumulating in the housing 106a of the punch 106.

Referring to FIG. 10, an embodiment of a process is disclosed that employs the system 100 described hereinabove with respect to FIGS. 2 to 9.

In an embodiment of carrying out the process of the invention, during a first phase of the process (see phase 1 of FIG. 10), the process includes a step of shaping the rubber strip 1000 with a predetermined thickness between the upper surface 1000a and the bottom surface 1000b of the rubber strip (for example, from a known extruder or a known calender) (not shown). After shaping, the rubber strip 1000 is fed to the system 100 so that it passes between the anvil 102 and the punch 106 (see arrow C). The punch 106 is rotated in the same direction as the rubber belt 1000 with the ejector 114 in the standby position.

During a second phase of the process (see phase 2 in FIG. 10), as a function of the rotation of the punch 106, the process includes a sampling step. This step includes the step of lifting the rubber strip 1000 so that it is engaged at its bottom surface 1000b in the punch 108. During this step, with the ejector 114 remaining in the standby position, the hook 126 engages the rubber strip 1000 simultaneously with the continuous rotation of the punch 106. In addition, the die-cutter 108, by engaging with the bottom surface 1000*b* of the rubber strip 1000, presses the rubber strip 1000 against the circumferential surface 102*a* of the anvil 102. Under the force of this pressure, the rubber strip 1000 is pushed into the die-cutter 108 so that a sample is held captive by the die-cutter.

During a third phase of the process (see phase 3 of FIG. 10), the process includes a step of engaging a sample 500, obtained during the previous step. During this step, the ejector 114 remains in the standby position. During this step, the hook 126 secures the sample 500 while the punch 106 turns to a down position (represented by phase 4 in FIG. 10).

During a fourth phase of the process (see phase 4 in FIG. 10), a pressurized fluid (e.g., compressed air) is supplied to the rod cylinder 118 so that piston 120 moves into the pressurized chamber 122. This movement, carried out simultaneously with the continuous rotation of the punch 106 towards the down position, also effects corresponding movement of the ejector 114. During this step, the guide ring 130 guides the ejector 114 from the standby position inside the housing 106*a* to the release position inside the die-cutter 108 (see arrow E in FIG. 10). As a result, the inclined surface 128*a* of the arm 128 of the hook 126 engages the inclined surface 114*b'* of the recess 114*b*, and the hook 126 no longer engages the sample 500.

In the down position, the ejector 114 releases the sample 500 from the domed surface S to a recovery means (e.g., a belt or a conveyor) (not shown). The recovery means transports all samples to a laboratory for the required analyses.

The rubber strip 1000 remains in movement until the end of the sampling process cycle. During each cycle, the punch 106 can rotate several times depending upon the number of samples scheduled for the cycle.

A cycle of the sampling process can be realized by PLC control and can include pre-programming of operating information. For example, a profile can be associated with each shaped rubber strip, characterized by the number of samples to be taken during a programmed sampling cycle, the size of the samples to be taken, the frequency of sampling, and the receiving and sending of data indicating the transfer of the sample for analysis. The PLC controls the list of samples that are ordered, and it compares this list with the samples that are taken.

For all the embodiments, a monitoring system may be put in place. If the analysis of the samples shows unexpected variations in rubber properties, the monitoring system can stop the mixing line in which the rubber strip 1000 is shaped and/or the system 100. At least part of the monitoring system can be provided in a portable device such as a mobile network device (e.g., cell phone, laptop computer, portable network connected device, portable network connected clothing and/or any combination and/or equivalent).

In embodiments of the invention, the system 100 may receive voice commands or other audio data representing a request for samples and/or the current status of samples in the analysis. The request may include a request for the current status of a sampling cycle. A generated response can be represented audibly, visually, tactilely (e.g., using a haptic interface) and/or virtually.

In an embodiment, the process can include a step of training the system 100 to recognize the optimal size and/or the optimal sampling frequency of the rubber strip. The training step includes a classification of samples generated by self-learning means. This classification may include, without limitation, the parameters of the strips from which the samples are obtained (e.g., its thicknesses, lengths, rubber recipes, etc.), the parameters of the samples (e.g., their thicknesses, diameters, the number of samples obtained, etc.) and the duration of the sampling cycles.

The terms "at least one" and "one or more" are used interchangeably. Ranges that are presented as "between a and b" include both "a" and "b" values.

Although specific embodiments of the disclosed device have been illustrated and described, it is understood that various changes, additions and modifications may be made without deviating from the spirit and scope of this presentation. Therefore, no limitations should be imposed on the scope of the invention described except those set out in the annexed claims.

The invention claimed is:

1. An automatic sampling system for taking samples from a rubber strip after it has been shaped and while it is moving in a predetermined direction, the system comprising:
   an anvil comprising a cylinder of a predetermined diameter and with a circumferential surface that engages the rubber strip during its movement, the anvil being fixed so that it is rotatable about an axis of rotation; and
   a punch with a cylindrical housing of a predetermined length extending between a sampling end and an opposite installation end, the punch comprising:
      a die-cutter provided at the sampling end for perforating the rubber strip and for obtaining samples of the rubber strip during its movement, the punch having an annular blade of a predetermined diameter;
      a fastening and support member provided at the installation end to carry out installation of the punch with respect to a drive shaft to which the punch is rotatably attached, the punch rotating in the same direction as the movement of the rubber strip;
      an ejector disposed within the housing that moves along a common longitudinal axis among the ejector, the housing and the die-cutter, the ejector comprising a structure with a predetermined length that extends between a release end and an opposite attachment end, the release end comprising a domed surface characterized by a tapered surface area that facilitates release of the sample, and the attachment end comprising a fastener; and
      a rod cylinder constituting a piston with a rod and a chamber in which the piston slides, the rod cylinder comprising a fastening device for connecting the piston and the ejector so that the movement of the piston in the chamber upon supply of a pressurized fluid effects corresponding movement of the ejector between a standby position and a release position.

2. The system of claim 1, wherein the ejector further comprises a recess in the structure in which a hook is arranged such that the hook extends from the domed surface when the ejector is in the standby position, and such that each sample is released by the ejector when the ejector is in the release position.

3. The system of claim 2, wherein the hook includes an arm with an inclined surface that engages a corresponding inclined surface of the recess to allow complementary movement of the ejector relative to the attached hook.

4. The system of claim 3, wherein the arm has an engagement end at which a catch is provided that includes one or more grooves for the hook to engage samples taken from the rubber strip simultaneously with their sampling by the die-cutter.

5. The system of claim 1, wherein the punch further comprises a guide ring with an opening, the guide ring being disposed at the sampling end of the housing along a common longitudinal axis among the housing, the die-cutter and the ejector in order to guide the ejector between the standby position and the release position.

6. The system of claim 1, wherein the fastening and support member includes two or more conduits in fluid communication with corresponding conduits that supply the rod cylinder with pressurized fluid.

7. An automated process for sampling a rubber strip moving in a predetermined direction, the process comprising the following steps:
   a first phase of the process comprising the following steps:
      the step of shaping the rubber strip to a predetermined thickness; and
      the step of directing the rubber strip, after shaping, to an automatic sampling system such that the rubber strip passes between an anvil and a punch of the automatic sampling system, the anvil comprising a cylinder of a predetermined diameter and with a circumferential surface that engages the rubber strip during its movement, the anvil being fixed so that it is rotatable about an axis of rotation, and the punch having a cylindrical housing of a predetermined length extending between a sampling end and an opposite installation end;
   a second phase of the process comprising the following steps:
      the step of sampling the rubber strip by a die-cutter provided at the sampling end of the punch and having an annular blade of a predetermined diameter, with an ejector of the punch remaining in the standby position, the ejector being disposed within the housing of the punch and moving along a common longitudinal axis among the ejector, the housing and the die-cutter, the ejector comprising a structure with a predetermined length that extends between a release end comprising a domed surface with a tapered surface area and an opposite attachment end; and
      the step of taking a sample with the die-cutter;
   a third phase of the process comprising the following step:
      the step of engaging the sample taken during the second phase, with the ejector remaining in the standby position while securing the sample taken as the punch rotates toward a down position; and
   a fourth phase of the process comprising the following steps:
      the step of supplying a rod cylinder of the punch with pressurized fluid to effect corresponding movement of the ejector from the standby position to a release position, this step being performed simultaneously with the continuous rotation of the punch toward the down position; and
      the step of releasing the sample from the domed surface to a recovery means.

8. The process of claim 7, further comprising the step of training the automatic sampling system to recognize at least one of an optimal size and an optimal frequency for sampling the rubber strip.

9. The process of claim 7 or claim 8, further comprising the step of classifying samples generated by self-learning means.

* * * * *